(12) United States Patent
Durand

(10) Patent No.: US 9,162,605 B2
(45) Date of Patent: Oct. 20, 2015

(54) RATCHET STRAP BINDER AND METHOD OF ADJUSTING A STRAP IN LENGTH

(71) Applicant: 9269-1096 QUEBEC INC., Sainte-Ursule (CA)

(72) Inventor: Denis Durand, Saint-Ursule (CA)

(73) Assignee: 9269-1096 QUEBEC INC., Trois-Rivieres, Quebec (CA)

( * ) Notice: Subject to any disclaimer, the term of this patent is extended or adjusted under 35 U.S.C. 154(b) by 0 days.

(21) Appl. No.: 13/968,842

(22) Filed: Aug. 16, 2013

(65) Prior Publication Data

US 2013/0333169 A1    Dec. 19, 2013

Related U.S. Application Data

(63) Continuation of application No. PCT/CA2012/050094, filed on Feb. 17, 2012.

(60) Provisional application No. 61/578,363, filed on Dec. 21, 2011.

(51) Int. Cl.
    *B61D 45/00*      (2006.01)
    *B60P 7/08*      (2006.01)

(52) U.S. Cl.
    CPC ............. *B60P 7/083* (2013.01); *Y10T 24/2175* (2015.01)

(58) Field of Classification Search
    CPC ........... B60P 7/06; B60P 7/0846; B60P 7/083
    USPC ......... 254/214, 218, 221, 223, 225, 239, 243; 24/68 CD, 68 E, 68 R, 68 D, 909; 410/96, 410/101, 103; 242/388.3, 388.2, 396.4
    See application file for complete search history.

(56) References Cited

U.S. PATENT DOCUMENTS

| | | | |
|---|---|---|---|
| 2,442,266 A | | 5/1948 | Davis |
| 3,175,806 A | * | 3/1965 | Prete, Jr. .................... 24/68 CD |
| 3,180,623 A | | 4/1965 | Huber |
| 3,428,331 A | * | 2/1969 | Morgan et al. ................ 410/100 |
| 3,668,743 A | | 6/1972 | Roberts |
| 3,826,473 A | | 7/1974 | Huber |
| 4,155,537 A | | 5/1979 | Bronson et al. |
| 4,268,012 A | | 5/1981 | Ruehle et al. |
| 4,527,309 A | * | 7/1985 | Kawahara ................. 24/68 CD |
| 4,570,305 A | | 2/1986 | Smetz et al. |
| 4,622,721 A | | 11/1986 | Smetz et al. |

(Continued)

FOREIGN PATENT DOCUMENTS

| | | |
|---|---|---|
| CN | 201390192 Y | 1/2010 |
| FR | 2556421 A1 | 6/1985 |

*Primary Examiner* — Emmanuel M Marcelo
*Assistant Examiner* — Justin Stefanon

(57) ABSTRACT

The ratchet strap binder includes a main frame and a spool mounted for rotation inside the main frame. In one possible implementation, the spool has an outer surface and includes a first strap-receiving passageway extending inside the spool between opposite first and second openings located on the outer surface of the spool, and a second strap-receiving passageway extending inside the spool from a third opening located on the outer surface of the spool to at least the first passageway. Also disclosed is a method of adjusting a strap in length and a ratchet strap binder including an elongated strap passing inside the at least one strap-receiving passageway, the strap forming a loop to adjust the strap in length. The loop can be pulled using a finger-actuated pull tab attached to the loop or be pulled directly by the user's fingers.

6 Claims, 10 Drawing Sheets

(56) References Cited

U.S. PATENT DOCUMENTS

| | | | | |
|---|---|---|---|---|
| 4,823,443 | A | 4/1989 | Waters | |
| 4,913,608 | A * | 4/1990 | Royball | 410/103 |
| 4,993,769 | A * | 2/1991 | Chapalain | 294/74 |
| 5,401,216 | A * | 3/1995 | Fujikawa | 474/130 |
| 5,819,377 | A | 10/1998 | Huang | |
| 5,855,045 | A * | 1/1999 | Miura | 24/68 CD |
| 5,943,742 | A | 8/1999 | Huang | |
| 6,007,053 | A * | 12/1999 | Huang | 254/247 |
| 6,047,451 | A * | 4/2000 | Berger et al. | 24/68 SB |
| 6,158,932 | A * | 12/2000 | Little | 410/103 |
| 6,195,848 | B1 | 3/2001 | Jackson et al. | |
| 6,241,174 | B1 * | 6/2001 | Nelsen et al. | 242/388.3 |
| 6,247,208 | B1 * | 6/2001 | Creech | 24/68 BT |
| 7,100,902 | B1 | 9/2006 | Lu | |
| 7,107,655 | B1 * | 9/2006 | Huang | 24/68 CD |
| 7,150,079 | B2 | 12/2006 | Lundstedt | |
| 7,789,603 | B2 | 9/2010 | Huck | |
| 7,874,047 | B2 | 1/2011 | Breeden | |
| 7,942,360 | B2 | 5/2011 | Breeden | |
| 7,950,629 | B2 * | 5/2011 | Mamie | 254/225 |
| 2009/0119892 | A1 * | 5/2009 | Breeden et al. | 24/68 CD |
| 2012/0233824 | A1 * | 9/2012 | Breeden et al. | 24/68 CD |
| 2013/0025098 | A1 * | 1/2013 | Smith | 24/68 CD |

* cited by examiner

RATCHET STRAP BINDER AND METHOD OF ADJUSTING A STRAP IN LENGTH

CROSS-REFERENCE TO PRIOR APPLICATIONS

The present application is a continuation of PCT Patent Application No. PCT/CA2012/050094 filed on 17 Feb. 2012, which claims priority over a patent application filed in the United Kingdom on 18 Feb. 2011 under Ser. No. GB1102888.3 and titled "IMPROVED RATCHET STRAP BINDER", and over a patent application filed in the United States on 21 Dec. 2011 under Ser. No. 61/578,363 and titled "RATCHET STRAP BINDER", the entire contents of these applications being hereby incorporated by reference.

TECHNICAL FIELD

The technical field relates generally to ratchet strap binders and to methods of adjusting straps in length.

BACKGROUND

Ratchet strap binders are hand-operated devices that can be particularly useful for tying down objects or loads of various natures. A ratchet strap binder brings two connecting ends of the device closer to one another and generates a tension in a strap as a length of the strap is wound around a spool. The connecting ends can be, for instance, the opposite free ends of the strap or be one of the free ends of the strap and the end of another element of the ratchet strap binder. This other element can also be the main frame itself, such as shown in U.S. Pat. No. 3,180,623 (Humber) of 1965.

Only a relatively small length of the strap needs to be wound around the spool to achieve the desired tensioning and ratchet strap binders are often used with straps that are much too long for what is needed. This may sometimes complicate their installation since an excessive length of strap will require a large number of rotations of the spool to be compensated. The slack can also be too long for what the spool can take and as a result, the strap wound around the spool can make contact with the interior of the ratchet strap binder before the desired tension is reached. In such a situation, a user will need to find another way for shortening the length of the strap while still keeping the ability of rotating the spool to create the desired tension. This may not always be easy to do properly, especially with a ratchet strap binder having a strap where both opposite ends are used as the connecting ends.

Accordingly, there is still room for many improvements in this area of technology.

SUMMARY

Broadly stated, there is provided a ratchet strap binder from which a strap loop can be pulled for easily adjusting the length of the strap before tensioning.

In one aspect, there is provided a ratchet strap binder including: a main frame; and a spool mounted for rotation inside the main frame, the spool having an outer surface and including: two spaced-apart portions facing one another; a first strap-receiving passageway located within a space between the two spaced-apart portions, the first passageway extending between opposite first and second openings located on the outer surface of the spool; and a second strap-receiving passageway extending inside one of the spaced-apart portions of the spool from a third opening located on the outer surface of the spool to at least the first passageway.

In another aspect, there is provided a ratchet strap binder including: a main frame; a spool mounted for rotation inside the main frame, the spool having an outer surface and including: a first strap-receiving passageway extending inside the spool between opposite first and second openings located on the outer surface of the spool; and a second strap-receiving passageway extending inside the spool from a third opening located on the outer surface of the spool to at least the first passageway; and an elongated strap extending uninterruptedly between two opposite ends, the strap passing twice through the third opening and once through each of the first and the second opening, the strap having a strap loop running above the outer surface of the spool in-between the first and the second opening, the strap loop being adjustable in length upon pulling the loop away from the spool.

In another aspect, there is provided a ratchet strap binder including: a main frame; a spool mounted for rotation inside the main frame, the spool having an outer surface and including: a first strap-receiving passageway extending inside the spool between opposite first and second openings located on the outer surface of the spool; and a second strap-receiving passageway extending inside the spool from a third opening located on the outer surface of the spool to at least the first passageway; an elongated strap extending uninterruptedly between two opposite ends, the strap running through the first passageway from the first opening to the second opening; and a finger-actuated pull tab having a first portion in which passes the strap, the pull tab being movable between a proximal position and a distal position, whereby when in the proximal position, the first portion of the pull tab extends inside the second passageway and a second portion of the pull tab extends out the third opening, and whereby when in the distal position, the first portion of the pull tab is out of the second passageway and a strap loop is formed to adjust the strap in length, the strap loop extending out through the third opening.

In another aspect, there is provided a ratchet strap binder including: a main frame, the main frame including a transversal pin extending between two spaced-apart plates; a spool mounted for rotation inside the main frame, the spool having an outer surface and including: a first strap-receiving passageway extending inside the spool between opposite first and second openings located on the outer surface of the spool; and a second strap-receiving passageway extending inside the spool from a third opening located on the outer surface of the spool to at least the first passageway; and an elongated strap extending uninterruptedly between two opposite ends, the strap coming from the first opening passing inside the first passageway and then inside the second passageway where the strap goes out through the third opening, the strap forming a loop extending from the third opening to around the transversal pin and then back inside the second passageway through the third opening, the strap then continuing inside the first passageway and out of the spool through the second opening.

In another aspect, there is provided a method of adjusting a strap in length within a ratchet strap binder, the ratchet strap binder having a spool mounted for rotation inside the ratchet strap binder, the method including: (A) passing the strap through at least two openings among a set of at least three openings formed on an outer surface of the spool, the strap running inside the spool; and (B) adjusting the strap in length by pulling an end of a loop away from the spool, the strap passing at least once through each of the at least three openings when the strap is being adjusted in length.

In another aspect, there is provided a ratchet strap binder including: a main frame; a spool mounted for rotation inside the main frame, the spool having at least one strap-receiving passageway extending inside the spool; an elongated strap passing twice through the passageway to form a loop, the loop coming out of the passageway inside the spool and having a length that is proportional to a slack taken from the strap when the strap is adjusted in length; and a finger-actuated pull tab attached to the loop coming out of the passageway inside the spool, the pull tab preventing the loop from being unformed and thereby maintaining the loop permanently formed in the ratchet strap binder.

In another aspect, there is provided a ratchet strap binder including: a main frame, the main frame including two spaced-apart plates and a pin transversally-extending in-between the plates; a spool mounted for rotation inside the main frame, the spool having at least one strap-receiving passageway extending through the spool; and an elongated strap passing twice inside the at least one strap-receiving passageway, the strap forming a loop to adjust the strap in length, the loop passing around the transversally-extending pin and having a length that is proportional to a slack taken from the strap when the strap is adjusted.

In another aspect, there is provided a method of adjusting a strap in length within a ratchet strap binder, the ratchet strap binder having a spool mounted for rotation inside the ratchet strap binder, the method including: passing the strap twice through a passageway inside the spool to form a loop coming out of the passageway; preventing the strap from being completely removed from the ratchet strap binder; and adjusting the strap in length by pulling an end of the loop away from the spool using a finger-actuated pull tab attached to the loop, the loop having a length that is proportional to a slack taken from the strap when the strap is adjusted.

Further details on these aspects as well as other aspects of the proposed concept will be apparent from the following detailed description and the appended figures.

DETAILED DESCRIPTION

Figure 1:
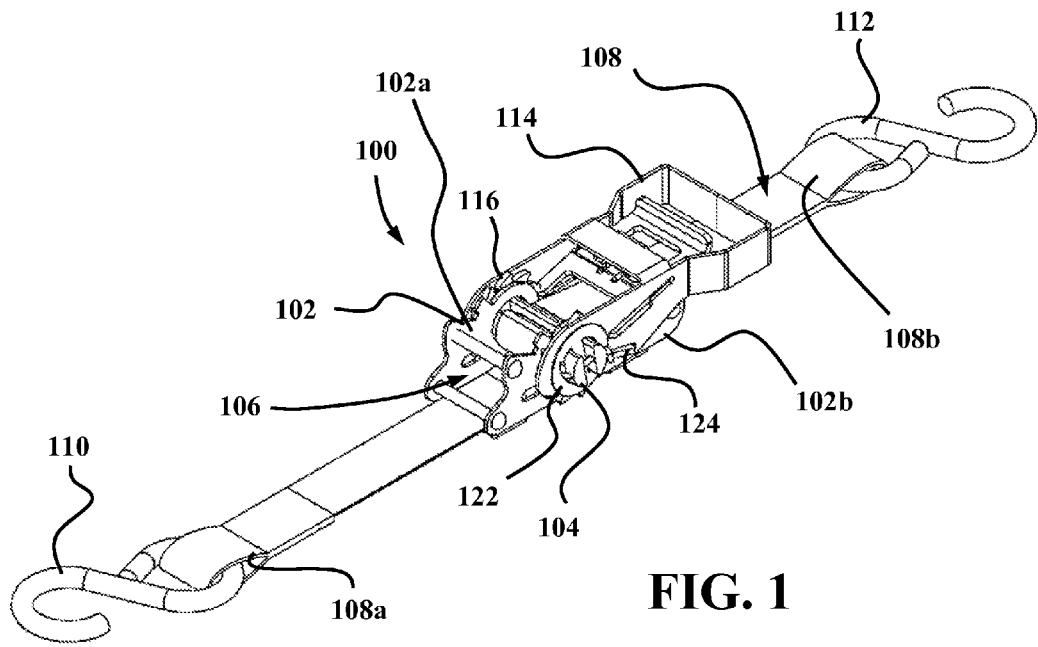
FIG. 1 is a top isometric view illustrating an example of a ratchet strap binder as proposed herein.

FIGS. 1 to 10 illustrate an example of a ratchet strap binder 100 as proposed herein. FIG. 1 is a top isometric view illustrating the ratchet strap binder 100. The ratchet strap binder 100 includes a main frame 102 and a spool 104 mounted for rotation inside an open space 106 of the main frame 102. The main frame 102 includes two spaced-apart side plates 102a, 102b, as shown. Variants are possible as well.

The spool 104 is the core member around which a given length of an elongated strap 108 is wound to create a tension in the strap 108 during use. The spool 104 extends transversally with reference to the main frame 102 and has opposite ends projecting out of the main frame 102 through corresponding side holes made in the side plates 102a, 102b. The strap 108 is shown as being very short in length only for the sake of illustration. In most implementations, the length of the strap 108 would be much longer.

The main frame 102 and the spool 104 can be made of metal. Variants are also possible. For instance, the main frame 102 and/or the spool 104 can be made of a plastic material. Some implementations may also include a main frame 102 and/or a spool 104 that can be made of more than one material. The spool 104 can have a substantially circular cross section, as shown. Variants are possible as well, including non-circular shapes.

A strap can be generically defined as a narrow strip or band made of a flexible material and that is significantly longer than its width. A strap can be made a various materials, for instance a strong fabric, but other materials could be used as well. Examples of materials include plastics, leather and metal, to name just a few. A strap is usually flat. Nevertheless, in some implementations, one can use a strap that is not entirely flat.

The strap 108 of the illustrated ratchet strap binder 100 includes two opposite ends 108a, 108b to which are permanently connected corresponding hooks 110, 112. Each end 108a, 108b forms an eyelet passing around the corresponding hooks 110, 112 and is stitched to make the connection permanent. In this example, this strap 108 cannot be removed from the rest of the ratchet strap binder 100 unless the strap 108 is cut or unless one of the hooks 110, 112 is otherwise removed. Variants are also possible as well. For instance, one or even both hooks 110, 112 can be replaced by another kind of connector, such as a ring, a clip, a carabiner, etc. Other implementations may not need hooks or the like if the ends 108a, 108b can be used directly on the item to hold.

The illustrated strap binder 100 includes a double-sided ratchet mechanism activated by a handle 114 that is pivotally mounted around the main frame 102 and coaxially disposed with reference to the spool 104. The ratchet mechanism includes a pair of ratchet wheels 116 and also a spring-loaded dog or pawl 118 mounted on the handle 114. The ratchet wheels 116 are in torque-transmitting engagement with the spool 104. The pawl 118 is selectively movable between a first position where it engages the ratchet wheels 116 and thereby prevents the spool 104 from rotating in one direction without also rotating the handle 114, and a second position where it is out of engagement with the ratchet wheels 116 so that the spool 104 can rotate freely in any direction. The second position of the pawl 118 usually requires that the user pulls the pawl 118 with at least one finger until the proximal end of the pawl 118 is out of engagement with the ratchet wheels 116. The pawl 118 is finger-activated against the force of the spring. Thus, in FIG. 1, the spool 104 is in a torque-transmitting engagement with the pawl 118 if the torque comes from the spool 104 in a direction that corresponds to the clockwise direction on FIG. 1. The spool 104 is thus prevented from rotating in that situation when the handle 114 is completely collapsed against the main frame 102, as shown in FIG. 1. The pawl 118 is also in a torque-transmitting engagement with the spool 104 if the torque comes from a pulling force on the handle 114 in the counterclockwise direction, such as when the user pulls the handle 114 to wind a portion of the strap 108 around the spool 104.

A second spring-loaded pawl 120 (see FIG. 8 for instance) is mounted on the main frame 102 to prevent the spool 104 from rotating backwards when the handle 114 is swung backwards. The second pawl 120 also engages the ratchet wheels 116.

In use, swinging the handle 114 in a counterclockwise direction in FIG. 1 will rotate the spool 104 in that direction and wind a portion of the strap 108 around the spool 104, thereby bringing the opposite ends 108a, 108b of the strap 108 closer to one another. The handle 114 generally needs to be moved back and forth at least a few times until the tension in the strap 108 reaches the desired level. The spring-loaded pawls 118, 120 act as stoppers and do not need to be touched by the user when winding the strap 108. The spring-loaded pawls 118, 120 will only need to be depressed by the user to release the tension and unwind the strap 108.

It should be noted that the exact construction of the ratchet mechanism can vary from one implementation to another. The ratchet mechanism that is shown and described herein is only one possible example. Variants are possible as well.

The spool 104 can be made as a monolithic part (for instance a machined part) or made of an assembly of one or more parts. In the illustrated example, the spool 104 has a split-shaft construction. This spool 104 includes two spaced-apart portions 104a, 104b facing one another that are connected together at their ends using corresponding positioning holes made through the ratchet wheels 116 and also corresponding positioning holes made through opposite washers 122. The washers 122 are interposed between corresponding side members of the handle 114 and corresponding cutter pins 124. The two spool portions 104a, 104b form a generally cylindrical surface around the spool 104. Variants are possible as well.

Figure 2:
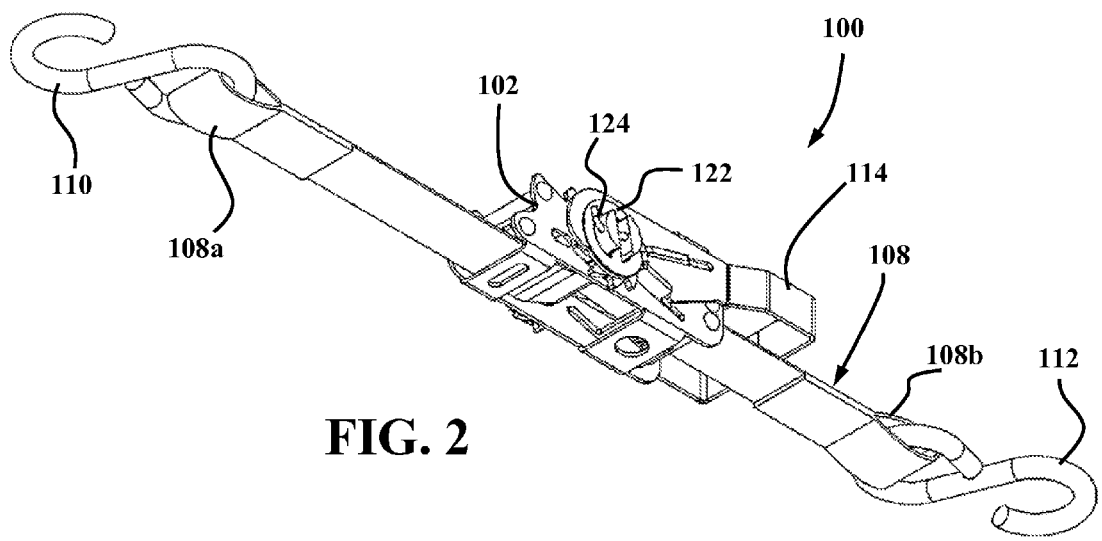
FIG. 2 is a bottom isometric view of the ratchet strap binder of FIG. 1.

FIG. 2 is a bottom isometric view of the ratchet strap binder 100.

Figure 3:
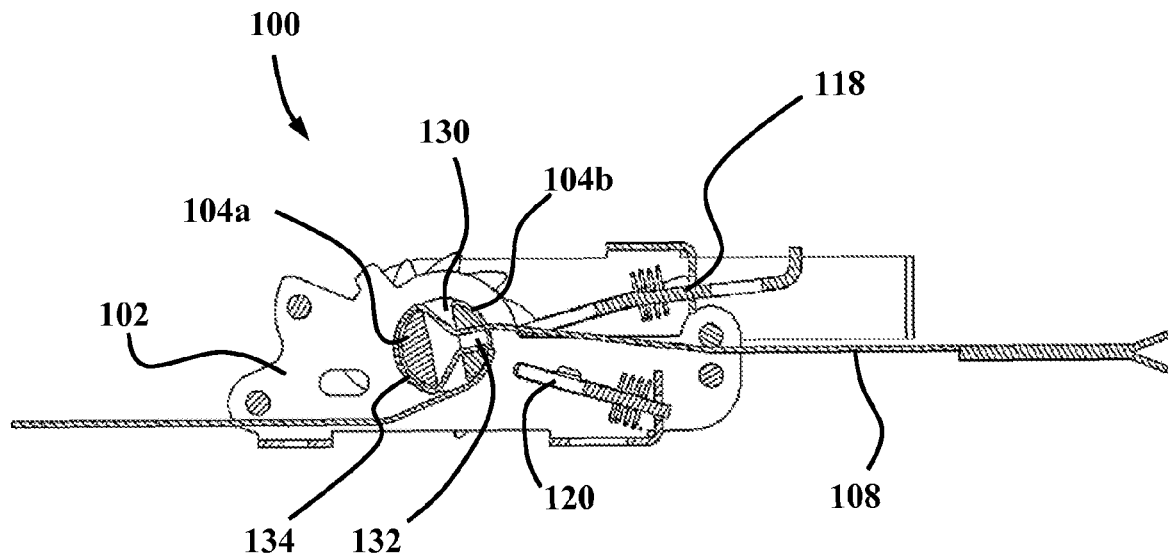
FIG. 3 is a longitudinal cross-sectional side view of the ratchet strap binder of FIG. 1.
Figure 4:
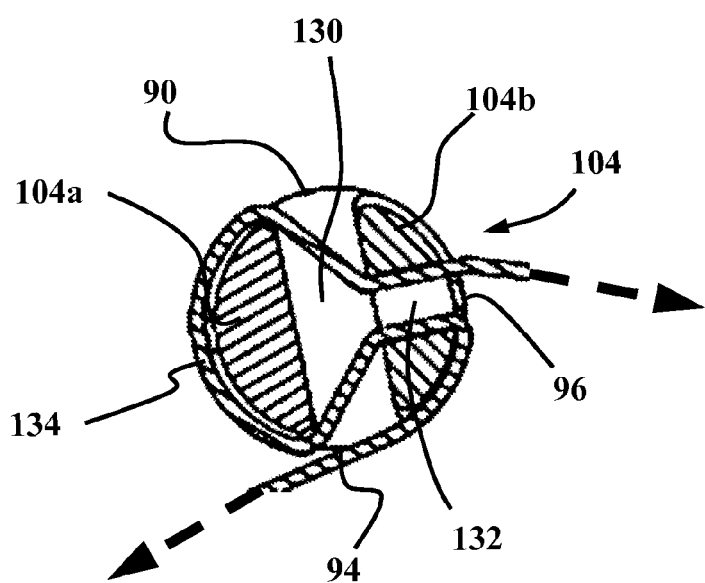
FIG. 4 is an enlarged cross-sectional view of the spool of the ratchet strap binder shown in FIG. 3.

FIG. 3 is a longitudinal cross-sectional side view of the ratchet strap binder 100. FIG. 4 is an enlarged cross-sectional view of the spool 104. As can be seen, the spool 104 includes a first strap-receiving passageway 130 diametrically extending across the spool 104 between opposite first and second openings 90, 92 on the outer surface of the spool 104. In the illustrated example, the first passageway 130 is in the form of a straight radial slot. The first and second openings 90, 92 are located about 180 degrees apart from one another with reference to a rotation axis of the spool 104. Variants are possible as well.

In accordance with an aspect of the proposed concept, the spool 104 includes a second strap-receiving passageway 132 extending from a third opening 96 on the outer surface of the spool 104 to at least the first passageway 130. In the illustrated example, the second passageway 132 is a straight radial slot made in the second half 104b and is connected to the center of the first passageway 130. Both passageways 130, 132 are orthogonal to one another. The third opening 96 is located about 90 degrees apart from the first and second openings 90, 92 with reference to the rotation axis of the spool. Variants are possible as well.

In some implementations, one can design the second passageway 132 to extend beyond the first passageway 130 and even up to a fourth opening (not shown). Other variants are also possible as well.

It should be noted that the interior of the spool could be in the form of a large inner chamber. In that context, the first and second passageways would be possible paths for the strap within that inner chamber.

When the strap 108 is assembled with the spool 104, the strap 108 passes through the second passageway 132 and a small loop 134 is formed over the opposite exterior side of the spool 104 before re-entering the second passageway 132 from inside the first passageway 130 to exit the spool 104.

Figure 5:
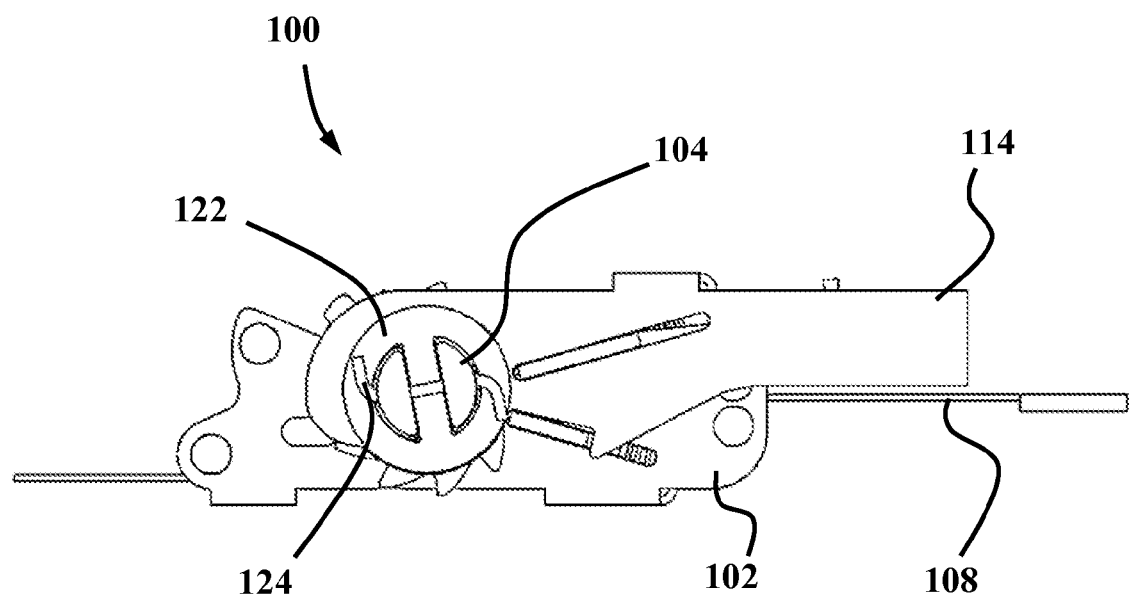
FIG. 5 is a side view of the ratchet strap binder of FIG. 1.
Figure 6:
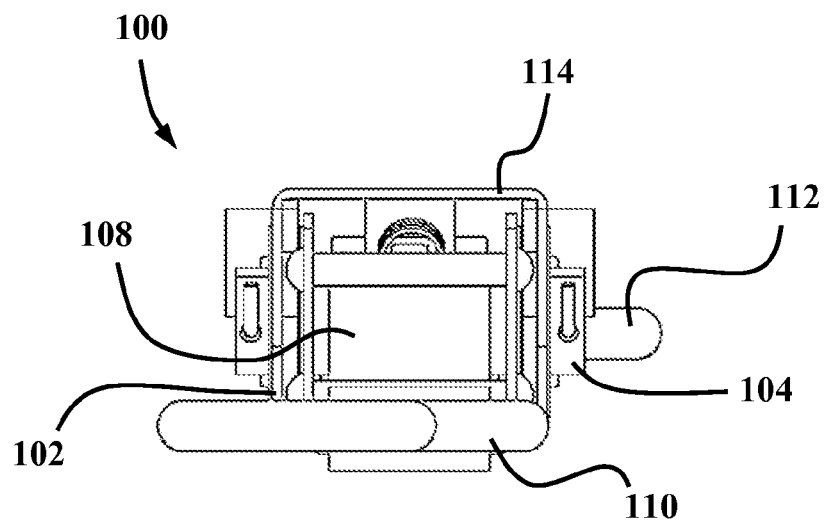
FIG. 6 is a front view of the ratchet strap binder shown in FIG. 1.
Figure 7:
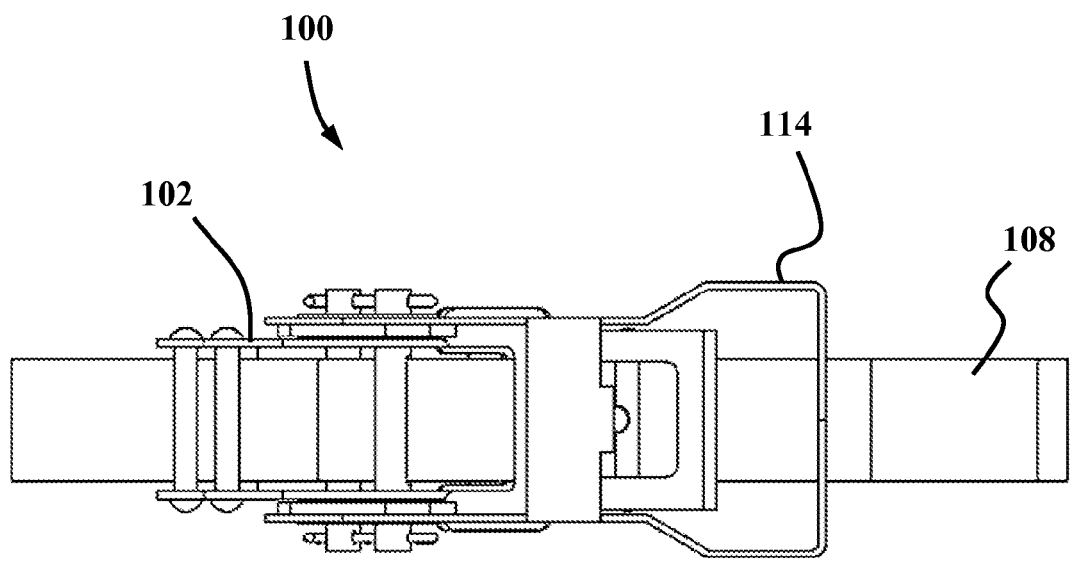
FIG. 7 is a top view of the ratchet strap binder of FIG. 1.

FIG. 5 is a side view of the ratchet strap binder 100. FIG. 6 is a front view of the ratchet strap binder 100. FIG. 7 is a top view of the ratchet strap binder 100.

Figure 8:
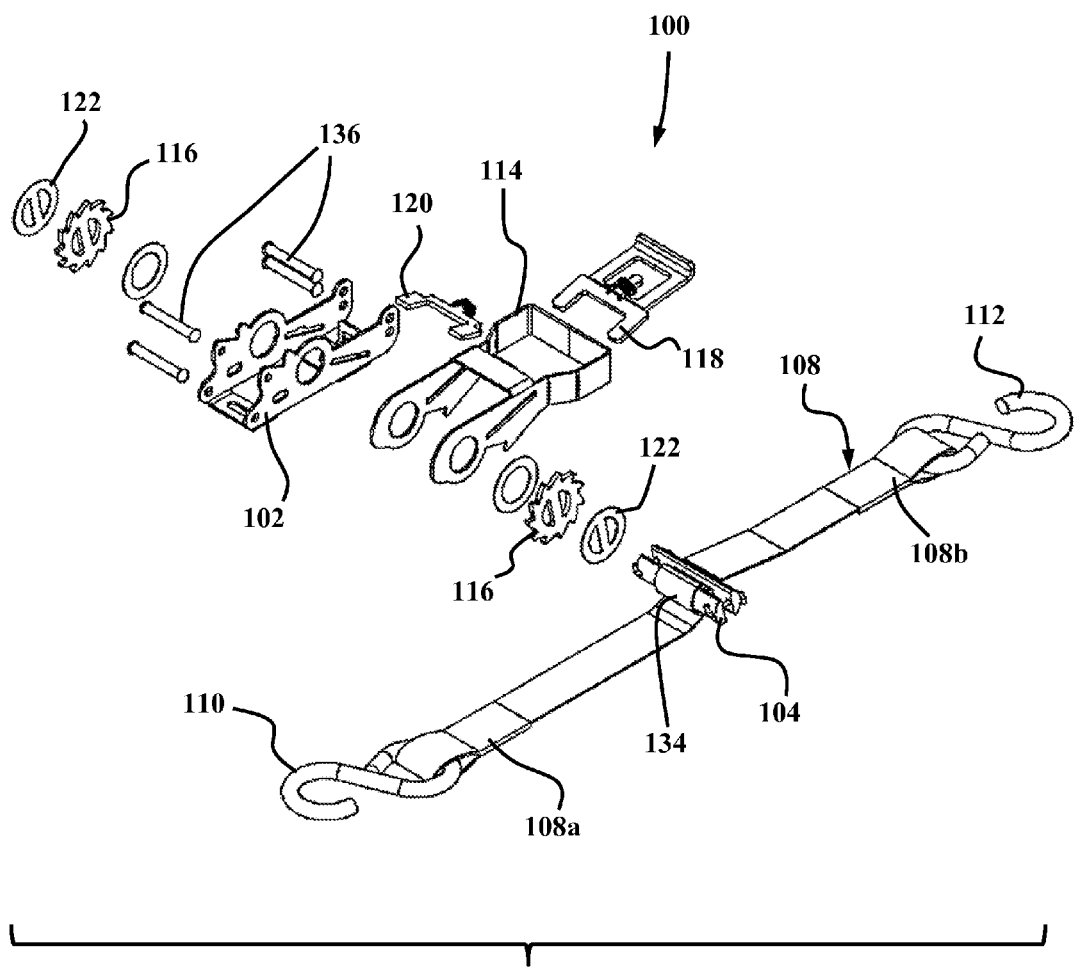
FIG. 8 is an isometric exploded view of the ratchet strap binder of FIG. 1.

FIG. 8 is an isometric exploded view of the ratchet strap binder 100. FIG. 8 further shows that the main frame 102 includes a plurality of transversal pins 136 to reinforce the structure. Some of these pins 136 are adjacent to the spool 104 when the ratchet strap binder 100 is assembled.

Figure 9:
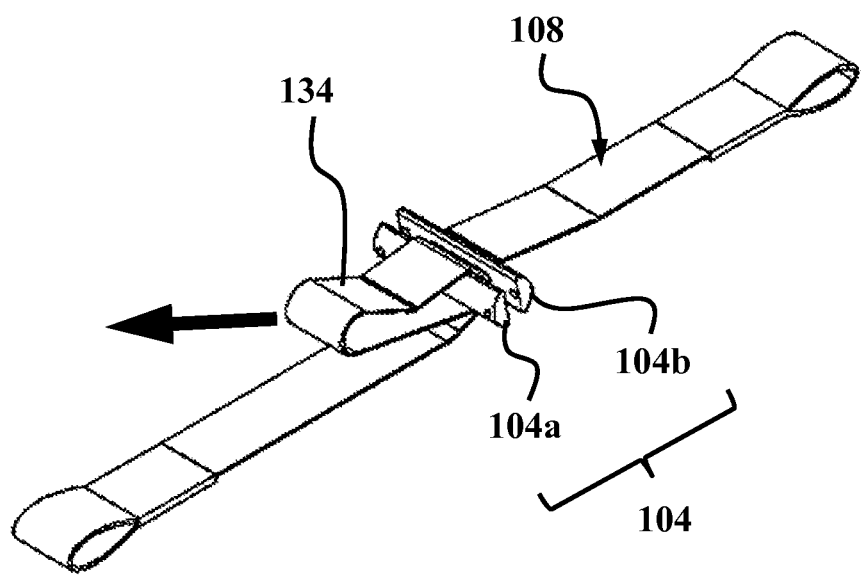
FIG. 9 is an isometric view illustrating only the spool and the strap of the ratchet strap binder of FIG. 1, the strap being shown as when a loop is pulled out of the ratchet strap binder to shorten the distance between the opposite ends of the strap.

FIG. 9 is an isometric view illustrating only the spool 104 and the strap 108 of the ratchet strap binder 100. The strap 108 is shown as when a loop 134 is pulled out of the ratchet strap binder 100 to shorten the distance between the opposite ends 108a, 108b of the strap 108. The loop 134 can be pulled, for instance, by one or more of the user's fingers.

Figure 10:
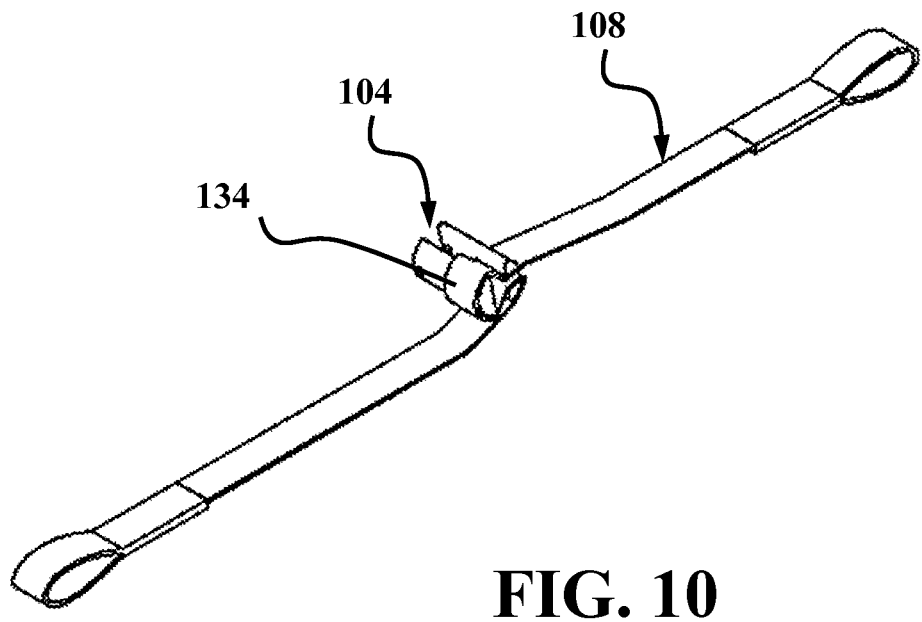
FIG. 10 is a longitudinal cross-sectional view of the spool and the strap of FIG. 8, illustrating the strap as it appeared before the loop is pulled.
Figure 11:
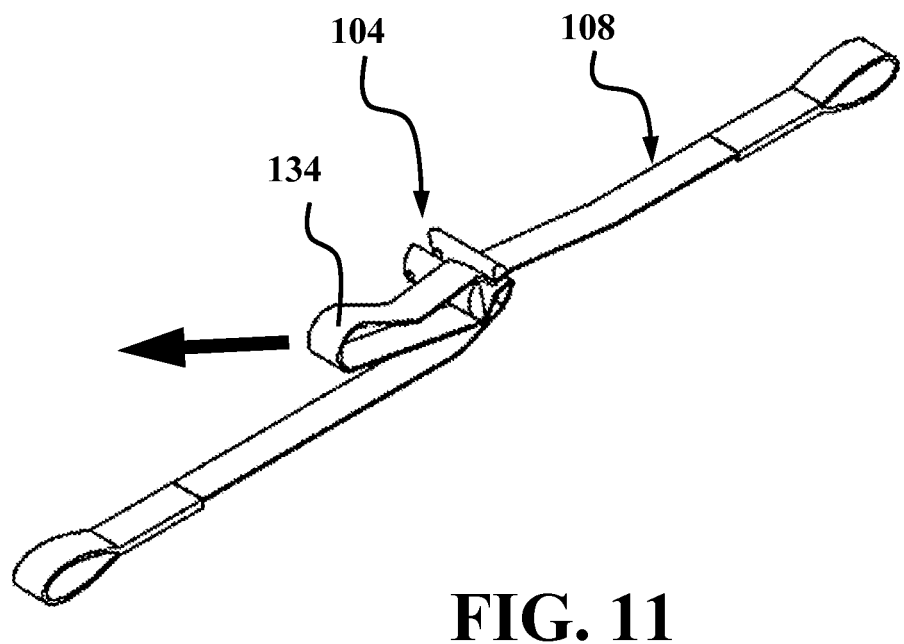
FIG. 11 is a view similar to FIG. 9, illustrating the strap with the loop being pulled.

FIG. 10 is a longitudinal cross-sectional view of the spool 104 and the strap 108 of FIG. 9, illustrating the strap 108 as it appeared before the loop 134 is pulled. FIG. 11 is a view similar to FIG. 10, illustrating the strap 108 with the loop 134 being pulled.

Figure 12:
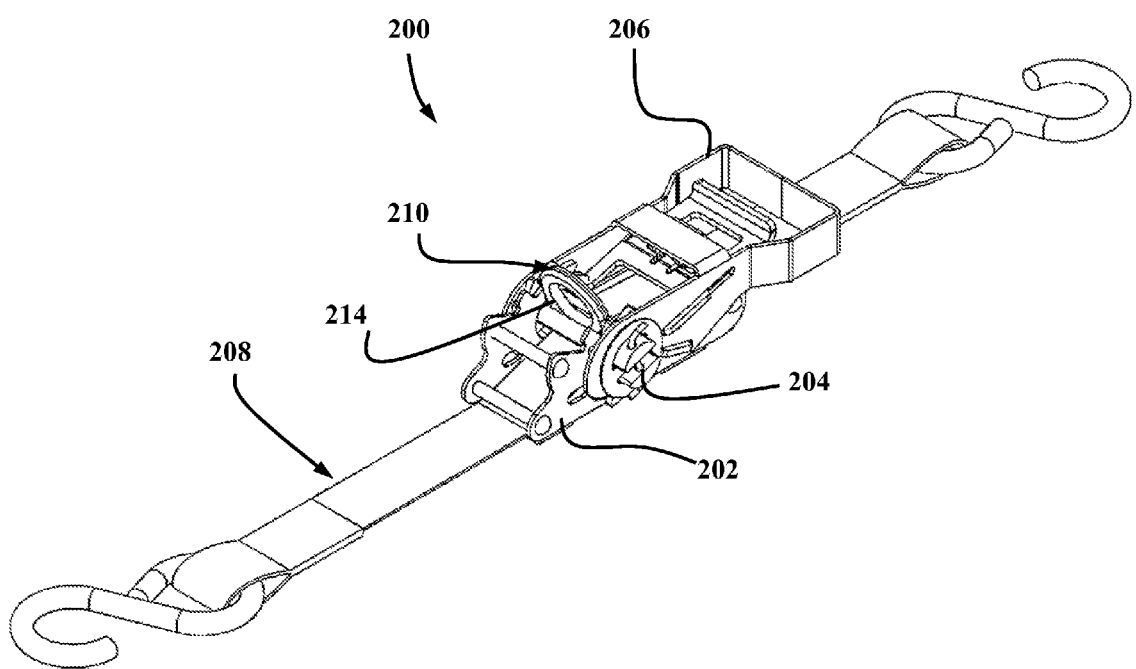
FIG. 12 is a top isometric view illustrating another example of a ratchet strap binder as proposed herein.
Figure 13:
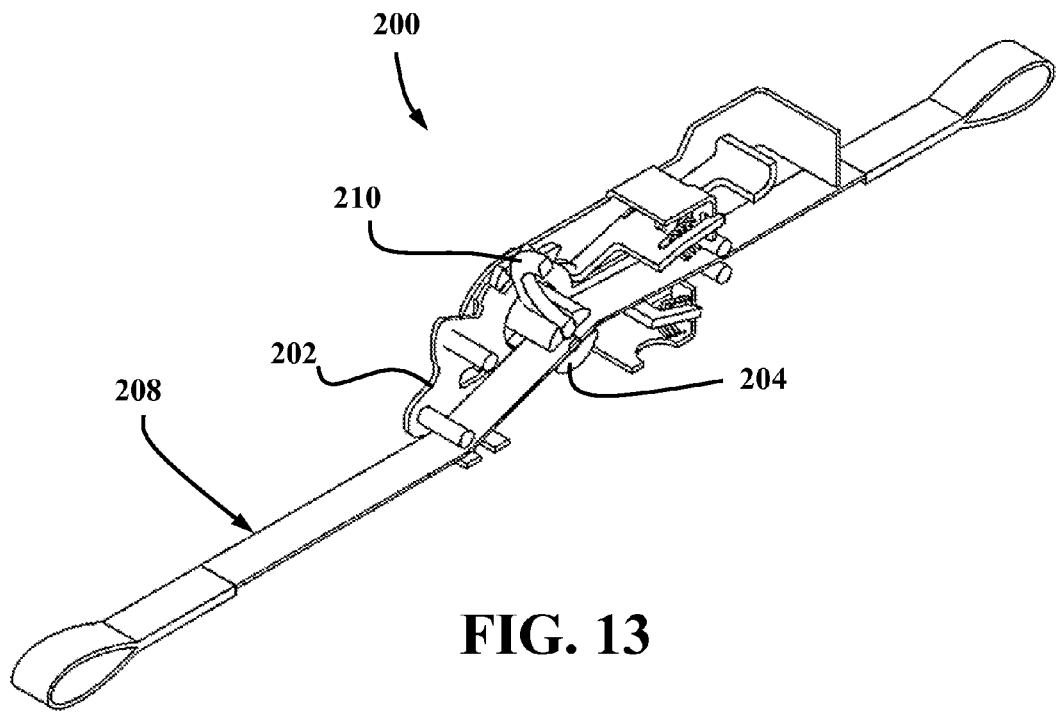
FIG. 13 is a longitudinal cross-sectional isometric view of the ratchet strap binder of FIG. 11.
Figure 14:
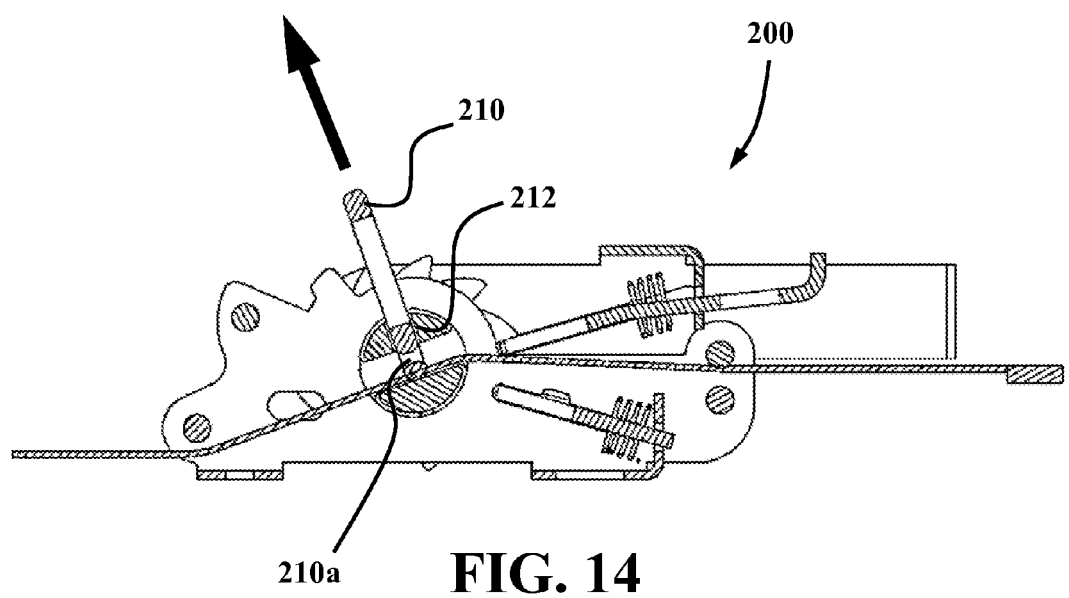
FIG. 14 is a longitudinal cross-sectional side view of the ratchet strap binder of FIG. 11.

FIGS. 12 to 14 are views illustrating another example of a ratchet strap binder 200 incorporating the proposed concept. FIG. 12 is a top isometric view of the ratchet strap binder 200. FIG. 13 is a longitudinal cross-sectional isometric view of the ratchet strap binder 200. FIG. 14 is a longitudinal cross-sectional side view of the ratchet strap binder 200.

Like the ratchet strap binder 100 of FIGS. 1 to 11, the ratchet strap binder 200 includes a main frame 202, a spool 204, a handle 206 and a strap 208, to name just a few. However, the ratchet strap binder 200 further includes a finger-actuated pull tab 210. The pull tab 210 is initially in a proximal position where it has a first portion 210a with a hole in which passes the strap 208 and a second portion that extends out a second passageway 212 of the spool 204. In the illustrated example, the second portion of the pull tab 210 includes a ring 214 to facilitate handling by the user. The pull tab 210 is shown in FIGS. 12 to 14 before a loop is formed to remove an excessive length of the strap 208, thereby adjusting the strap 208 in length. Pulling the pull tab 210 in the direction of the arrow will force the loop out of the second passageway 212 of the spool 204 towards a distal position.

It should be noted that the pull tab 210 can also be used with the first example shown in FIGS. 1 to 11. One can also use the pull tab 210 with any other model of ratchet strap binder.

Figure 15:
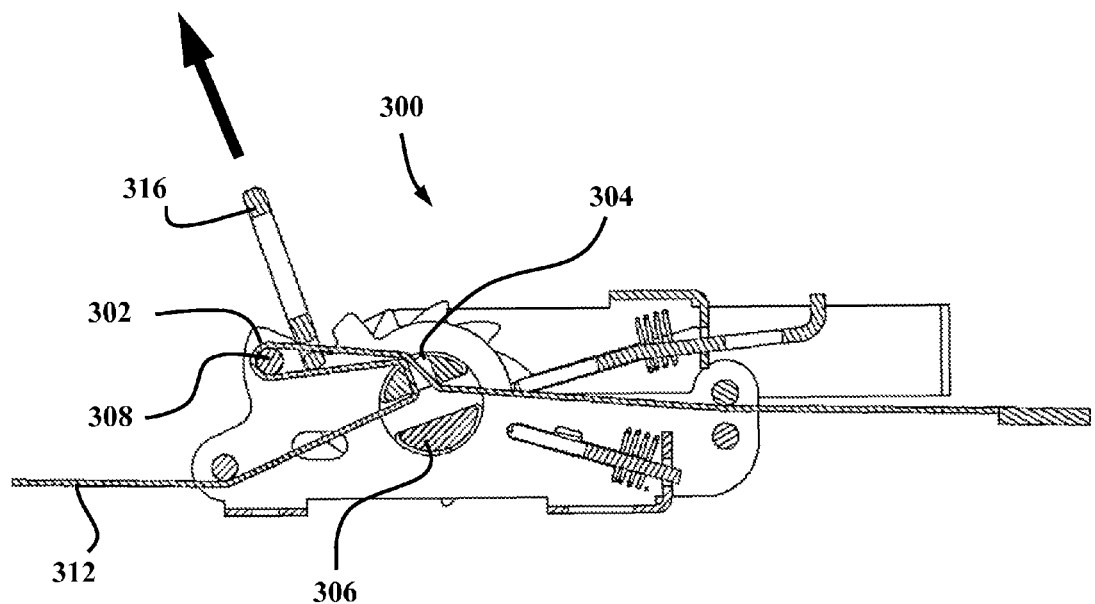
FIG. 15 is a longitudinal cross-sectional side view illustrating another example of a ratchet strap binder as proposed herein.

FIG. 15 is a longitudinal cross-sectional side view illustrating another example of a ratchet strap binder 300 as proposed herein. In the ratchet strap binder 300, the loop 302 that comes out the second passageway 304 of the spool 306 is always present in the ratchet strap binder 300 because it goes around a transversal pin 308 of the main frame 310. The slack in the strap 312 can be taken by pulling the loop 302 using the user's fingers and/or by pulling the pull tab 316 provided in the illustrated example. One can also omit the transversal pin 308 or the pull tab 316 in some implementations.

Figure 16:
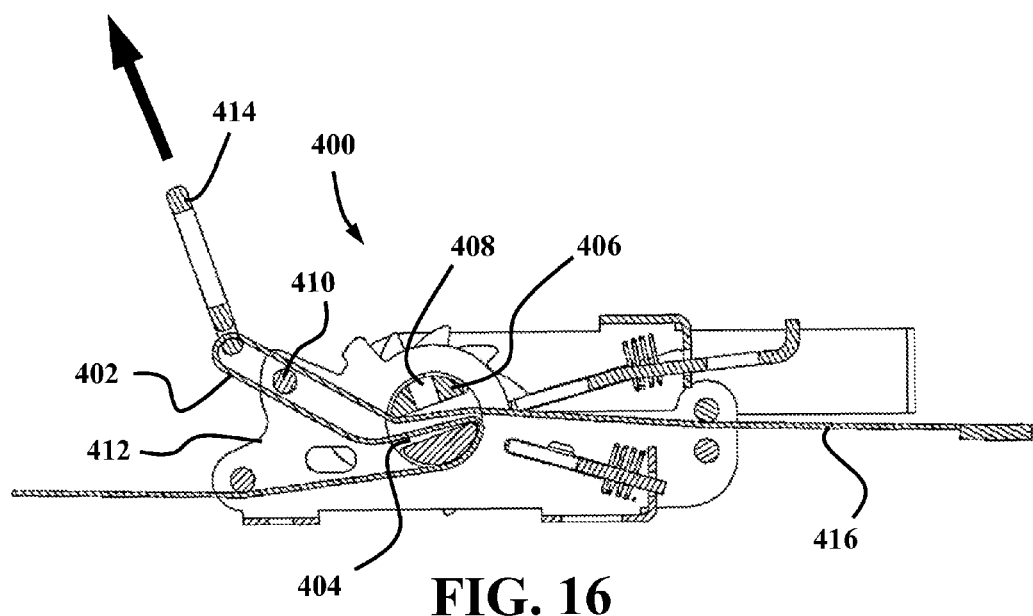
FIG. 16 is a longitudinal cross-sectional side view illustrating another example of a ratchet strap binder as proposed herein.

FIG. 16 is a longitudinal cross-sectional side view illustrating another example of a ratchet strap binder 400 as proposed herein. The ratchet strap binder 400 is somewhat similar to the ratchet strap binder 300 with the exception that the loop 402 is only inserted through the first passageway 404 of the spool 406. Thus, one can omit the illustrated second passageway 408 when using this implementation. The loop 402 is always present in the ratchet strap binder 400 because it also goes around the transversal pin 410 of the main frame 412. The pull tab 414 is also optional. Alternatively, one can omit the transversal pin 410 and only use the pull tab 414. The pull tab 414 can be made larger to prevent it from easily passing through the first passageway 404 and the openings thereof. The pull tab 414 can be pulled by the user to pull the end of the loop 402 away from the spool 406, thereby adjusting the strap 416 in length.

The present concept also provides a method of adjusting a strap in length within a ratchet strap binder. The method first includes passing the strap through at least two openings among a set of at least three openings formed on an outer surface of the spool. The strap runs inside the spool.

Then, the method includes providing instructions for adjusting the strap in length by pulling an end of a loop away from the spool. The strap passes at least once through the set of the at least three openings when the strap is being adjusted in length.

The step of providing instructions can be done different ways. For instance, one can print the instructions on a sheet, on a package or an instruction manual. These instructions can be in the form of a text and/or some graphical (for instance pictures, pictograms, drawings, etc.) Instructions can be also provided in advertisements, on web sites, in live demonstrations, etc.

To bring opposite ends of the strap closer to one another, the spool is rotated in a strap tensioning direction to wind a portion of the strap around the spool.

Alternatively, the method may also include: (A) passing the strap through a passageway inside the spool; and (B) providing instructions for adjusting the strap in length by pulling an end of a loop away from the spool using a finger-actuated pull tab.

The present detailed description and the appended figures are meant to be exemplary only. A skilled person will recognize that variants can be made in light of a review of the present disclosure without departing from the proposed concept.

What is claimed is:

1. A ratchet strap binder including:
    a main frame;
    a spool mounted for rotation inside the main frame, the spool having at least one strap-receiving passageway extending inside the spool;
    an elongated strap passing twice through the passageway to form a loop, the loop coming out of the passageway inside the spool and having a length that is proportional to a slack taken from the strap when the strap is adjusted in length; and
    a pull tab in which passes the strap, the pull tab being attached to the strap on the loop coming out of the passageway inside the spool, the pull tab preventing the loop from being unformed and thereby maintaining the loop permanently formed in the ratchet strap binder.

2. The ratchet strap binder as defined in claim 1, wherein the loop goes around a transversal pin extending between two spaced-apart plates of the main frame.

3. The ratchet strap binder as defined in claim 2, wherein the transversal pin is rigidly attached to the two spaced-apart plates of the main frame.

4. The ratchet strap binder as defined in claim 1, further including:
    a ratchet mechanism operatively connected to the main frame, the ratchet mechanism cooperating with the spool.

5. The ratchet strap binder as defined in claim 1, wherein the pull tab includes a ring.

6. The ratchet strap binder as defined in claim 1, wherein the spool has a split-shaft construction, the spool including two spaced-apart portions facing one another and being removably connected together at corresponding ends.

* * * * *